(12) United States Patent
Wei et al.

(10) Patent No.: US 8,851,899 B2
(45) Date of Patent: Oct. 7, 2014

(54) PORTABLE SOLAR TEACHING AID

(75) Inventors: Haigui Wei, Guangdong (CN);
Shoujiang Huang, Guangdong (CN);
Dongli Huang, Guangdong (CN)

(73) Assignee: Shenzhen Sacred Industry Co., Ltd, Shenzhen (CN)

(*) Notice: Subject to any disclaimer, the term of this patent is extended or adjusted under 35 U.S.C. 154(b) by 0 days.

(21) Appl. No.: 13/522,452

(22) PCT Filed: Mar. 1, 2012

(86) PCT No.: PCT/CN2012/071827
§ 371 (c)(1),
(2), (4) Date: Jul. 16, 2012

(87) PCT Pub. No.: WO2012/116650
PCT Pub. Date: Sep. 7, 2012

(65) Prior Publication Data
US 2014/0011174 A1    Jan. 9, 2014

(30) Foreign Application Priority Data
Mar. 3, 2011 (CN) .......................... 2011 1 0051487

(51) Int. Cl.
*G09B 23/18* (2006.01)
*G09B 23/06* (2006.01)

(52) U.S. Cl.
CPC ................ *G09B 23/18* (2013.01); *G09B 23/06* (2013.01)
USPC ....................................................... 434/301

(58) Field of Classification Search
CPC .......... G09B 23/18; G09B 5/062; G09B 5/06; G09B 7/02; G09B 7/063
USPC ....................................................... 434/301
See application file for complete search history.

(56) References Cited

U.S. PATENT DOCUMENTS 4,213,253 A * 7/1980 Gudelis et al. ................ 434/224
(Continued)

FOREIGN PATENT DOCUMENTS

CN    201477774 U    5/2010
(Continued)

OTHER PUBLICATIONS

International Search Report for PCT application PCT/CN2010/071827 (which is the parent PCT application for this US application) and English translation.
(Continued)

*Primary Examiner* — Robert J Utama
*Assistant Examiner* — Robert P Bullington
(74) *Attorney, Agent, or Firm* — Garcia-Zamor IP Law; Ruy M. Garcia-Zamor

(57) ABSTRACT

This invention discloses a portable solar teaching aid, including a portable case of which the case body and cover are flexibly connected; a sunlight analog device, of which the analog light source is fixed in the case body; a solar energy conversion device for converting analog sunlight into electric energy; some teaching appliances, which have electrical connection with the solar energy conversion device. The present invention provides a portable case to install a sunlight analog device, a solar energy conversion device and some teaching appliances in, thereby it is easy to carry and suitable for teaching purpose. The sunlight analog device is powered by electric supply to generate light which is similar to sunlight. The light can be converted into electric energy by solar energy conversion device and then transmitted to teaching appliances. This invention helps the students to get a direct vision of photovoltaic effect and have a hands-on operation of the application of solar energy so as to strengthen their awareness of low carbon and their understanding of the application of new energy.

8 Claims, 2 Drawing Sheets

(56) References Cited

U.S. PATENT DOCUMENTS

| | | | | |
|---|---|---|---|---|
| 4,623,312 A | * | 11/1986 | Crawford | 434/224 |
| 5,611,691 A | * | 3/1997 | Poulain | 434/224 |
| 2003/0043554 A1 | * | 3/2003 | Seymour | 361/760 |
| 2011/0143629 A1 | * | 6/2011 | Seymour et al. | 446/91 |
| 2013/0171606 A1 | * | 7/2013 | Seymour | 434/365 |

FOREIGN PATENT DOCUMENTS

| | | |
|---|---|---|
| CN | 201662913 U | 12/2010 |
| CN | 202008771 U | 10/2011 |
| CN | 102332221 A | 1/2012 |
| FR | 2529360 A1 | 12/1983 |
| JP | 9-281887 A | 10/1997 |

OTHER PUBLICATIONS

Written Opinion of International Searching Authority for PCT application PCT/CN2010/071827 (which is the parent PCT application for this US application) and English translation.

* cited by examiner

PORTABLE SOLAR TEACHING AID

CROSS REFERENCE TO RELATED APPLICATIONS

This application claims priority to the following patent applications: (1) Patent Cooperation Treaty Application PCT/CN2010/071827 filed Mar. 1, 2012; and (2) Chinese Patent Application No. CN201110051487.2 filed Mar. 3, 2011; each of the above cited applications is hereby incorporated by reference herein as if fully set forth in its entirety.

TECHNICAL FIELD

The present invention relates to a teaching aid, and in particular, to a portable solar teaching aid, which allows the students to get a direct vision and hands-on operation of photovoltaic effect so as to help them to better understand such photovoltaic effect.

BACKGROUND ART

At present, on the initiative of our government, low carbon and environmental protection have been gradually accepted and understood by people in China. The whole society, especially schools, has started to learn and publicize the knowledge of low carbon and environmental protection, guiding people in developing and utilizing new energy, especially solar energy which is inexhaustible and will be never used up. However, due to the lack of a suitable teaching aid, most of schools are currently limited to theoretical teaching and the students are not able to have a direct vision and hands-on operation of the application of solar energy, therefore it becomes an urgent matter to develop a portable solar teaching aid.

CONTENT OF THE INVENTION

It is therefore an object of the present invention to provide a portable solar teaching aid, which overcomes the above-described shortcomings of prior art, help the students to get a direct vision of photovoltaic effect and application of solar energy and allow them to have hands-on operation of this solar teaching aid. Depending on the demonstrations or experiments of solar teaching aid, the students are able to better understand the photovoltaic effect and application of solar energy.

To achieve the above-mentioned purpose, the invention adopts the following technical scheme:

A portable solar teaching aid is composed of:

A portable case, which the case body and cover are flexibly connected;

A sunlight analog device, of which the analog light source is fixed in the case body;

A solar energy conversion device for converting analog sunlight into electric energy;

Teaching appliances that work with the solar energy conversion device.

The case body and cover of the said portable case are flexibly connected and the sunlight analog device is fixed in the case body; the sunlight analog device includes:

A reflector, which extends from the bottom to the side wall of the portable case;

A light source, which is fixed inside the reflector; with electric supply, the light source generates analog sunlight. With the reflector, the analog sunlight is turned toward the opening of the case.

The said analog light source is a xenon lamp.

The said solar energy conversion device is a solar-cell panel, of which the front faces to the opening of the portable case so that the light coming out of the sunlight analog device can be converted into electric energy and then transmitted by wire.

The said solar-cell panel, there is a piece of super white tempering glass.

On the said cover of the portable case, there is a voltmeter and an ammeter respectively connected to the output circuit of solar-cell panel.

The said teaching appliances include a multicolored light-emitting diode lamp and a direct current fan.

There is an interface on the said case body for connecting to the sunlight analog device and an output port on the cover for connecting to the solar-cell panel. The said teaching appliances have electrical connection via output port.

On the side wall of the said case body, there is a cooling fan having electrical connection with electric supply.

The said portable case has an aluminum shell, and holders are equipped inside the case cover for fixing teaching appliances.

Due to the adoption of the above structure, the present invention provides a portable case to install a sunlight analog device, a solar energy conversion device and some teaching appliances in, thereby it is easy to carry and suitable for teaching purpose. The sunlight analog device is powered by electric supply to generate light which is similar to sunlight. The light can be converted into electric energy by solar energy conversion device and then transmitted to teaching appliances. This invention helps the students to get a direct vision of photovoltaic effect and have a hands-on operation of the application of solar energy so as to strengthen their awareness of low carbon and their understanding of the application of new energy.

MODE OF CARRYING OUT THE INVENTION

Now we will introduce this invention and its application through illustrations and detailed description.

Figure 1:
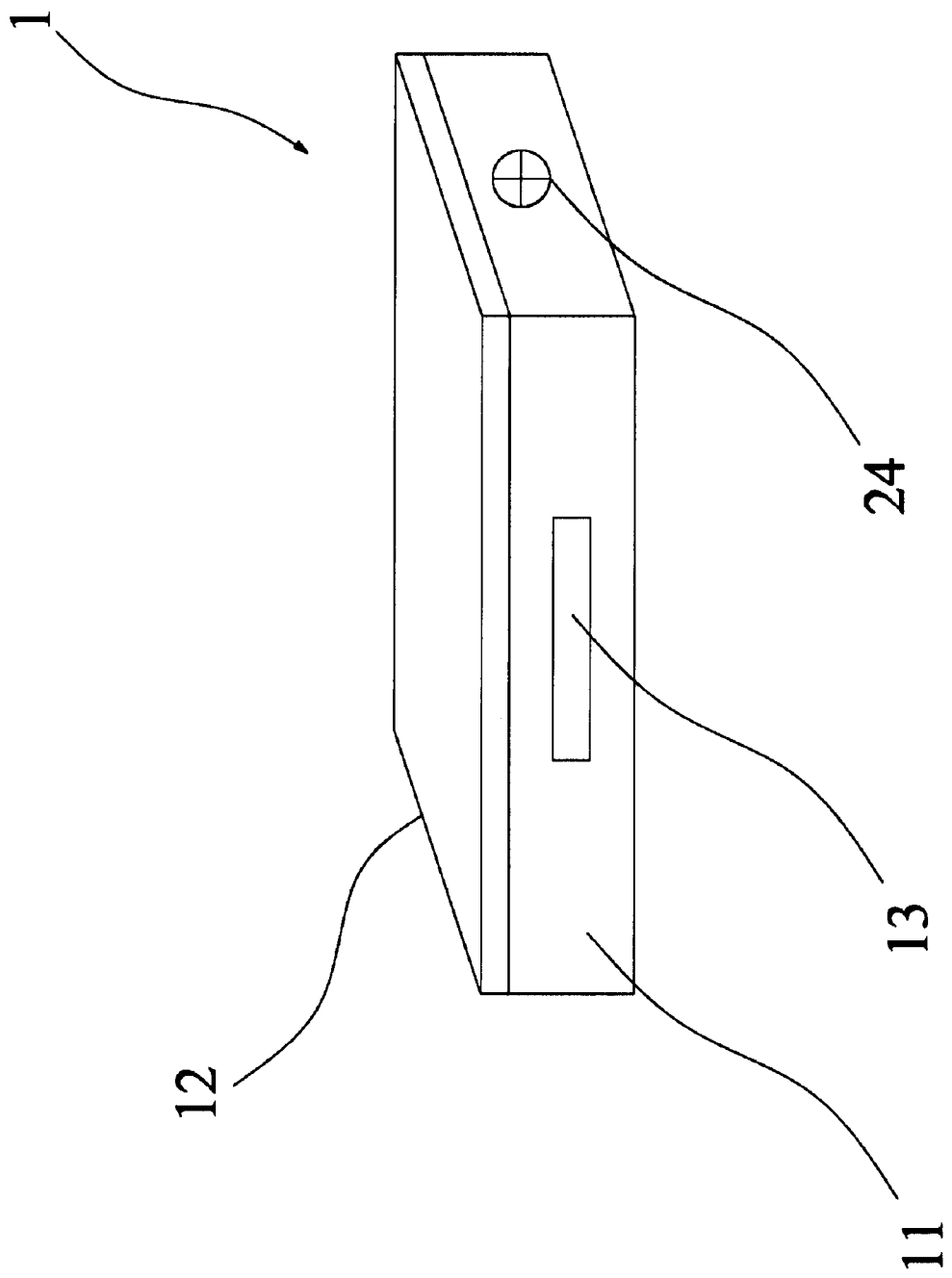
FIG. 1 is a structure diagram of the invention.
Figure 2:
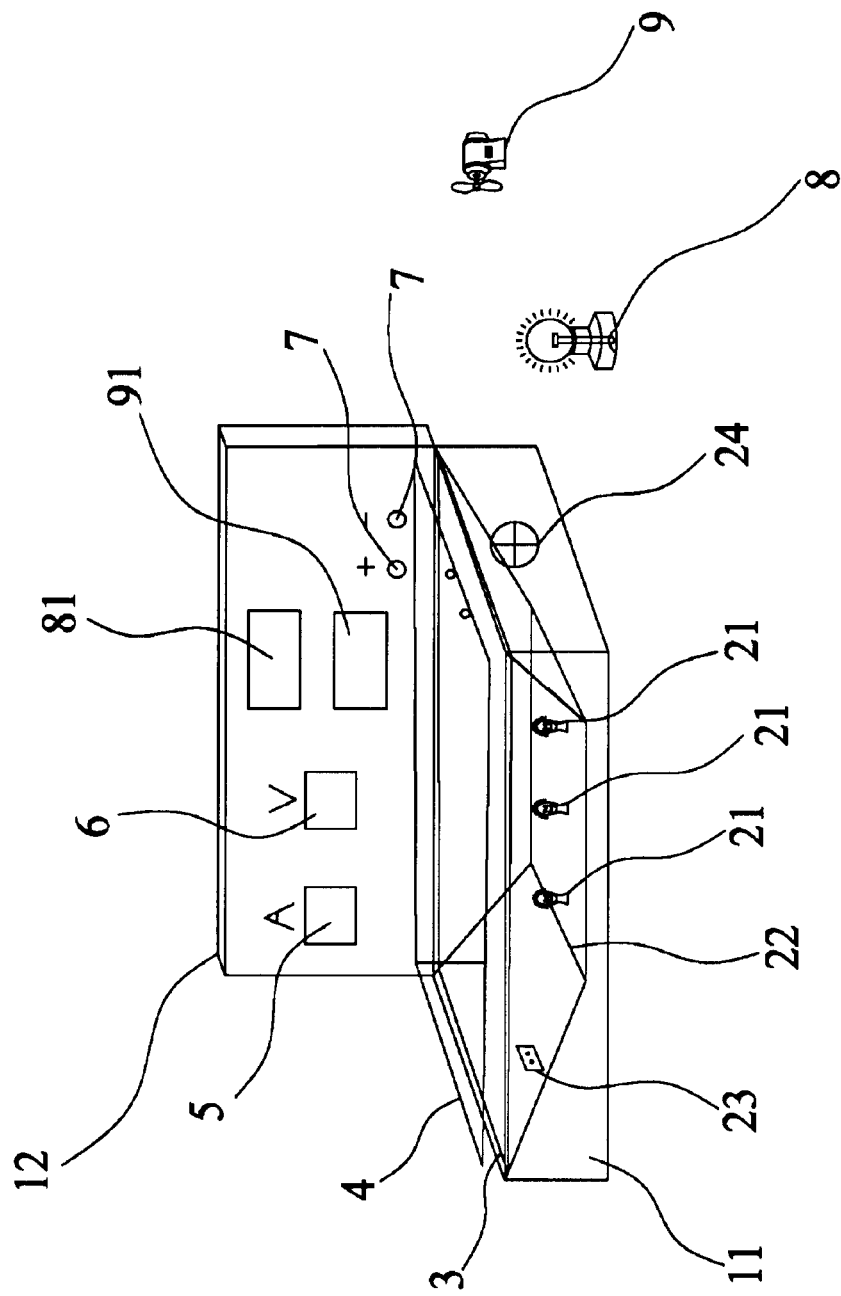
FIG. 2 is an exploded view of the invention.

FIG. 1 and FIG. 2 show a portable solar teaching aid, including a portable case 1. The portable case 1 includes case body 11, cover 12 and handle 13. The case body 11 has a socket 23 on one side for connecting to electric supply, and a sunlight analog device inside. The sunlight analog device includes a reflector 22 which extends from the bottom to the side wall of case body 11. The reflector 22 has a xenon lamp 21 in the center, which can generate analog sunlight. Above the reflector 22 and close to the opening of case body 11 is a piece of super white tempering glass 3. Above the tempering glass 3 is the solar energy conversion device. The solar energy conversion device is a solar-cell panel 4, with its face side downward, absorbing and converting the analog sunlight into electric energy as the power for teaching appliances.

The case cover 12 has a voltmeter 6 and ammeter 5, which have electrical connection with solar-cell panel. The reading of voltmeter 6 or ammeter 5 shows the output of electricity from solar-cell panel, and the electricity is transmitted via output 7 inside the case cover 12.

The teaching appliances include a multicolored light-emitting diode lamp 8 and a direct current fan 9, which can respectively be put on holder 81 and holder 91 inside the case cover 12. Take them off during demonstration and connect the wire to electric energy output 7 so that the teaching appliances can start operation. Of course, other or more teaching appliances can be added at will during demonstration, which can operate in the same manner.

There is a cooling fan 24 on the side wall of the case body, which can be connected to the electric supply to reduce the working temperature of analog light source.

Although the application has been described in great detail in the foregoing specification, it is to be understood that such descriptions of the embodiments are provided not for the purpose of limiting the scope of the invention as defined by the appended claims.

The invention claimed is:

1. A portable solar teaching aid comprising:
   a portable case comprising a case body and a cover flexibly connected to the case body to facilitate use of the portable solar teaching aid;
   a sunlight analog device fixed in the case body and comprising a reflector attached to a bottom of the case body and a sunlight analog source fixed inside the reflector and generating analog sunlight, wherein the reflector extends from one of inner sidewalls of the case body to another of the inner sidewalls of the case body and reflects as much as possible the analog sunlight toward an opening of the case body to decrease the analog sunlight loss as less as possible;
   a solar energy conversion device fixed in the case body to convert the analog, sunlight into electric energy, and
   a plurality of teaching appliances fixed on the cover and that work the solar energy conversion device to get a direct vision of photovoltaic effect and application of new energy;
   wherein the sunlight analog source is a xenon lamp so that the analog sunlight similar to Sunlight.

2. The portable solar teaching aid according to claim 1, wherein the solar energy conversion device is a solar-cell panel and is attached to a top portion defining the opening of the case body, wherein a light receiving surface of the solar-cell panel faces to the sunlight analog source so that the solar-cell panel can receive the analog sunlight as much as possible and can be converted the analog sunlight into electric energy and then transmitted by wires.

3. The portable solar teaching aid according to claim 2, wherein under the solar-cell panel, there is a piece of super white tempering glass.

4. The portable solar teaching aid according to claim 1, wherein the portable solar teaching aid further comprises a voltmeter and an ammeter both are mounted to the cover and respectively connected to an output circuit of solar-cell panel.

5. The portable solar teaching aid according to claim 1, the teaching appliances include a multicolored light-emitting diode lamp and a direct current fan.

6. The portable solar teaching aid according to claim 1, there is an interface in the case body for connecting to the sunlight analog device and an output port in the cover for connecting to the solar-cell panel, wherein the teaching appliances have electrical connection via the output port.

7. The portable solar teaching aid according to claim 1, wherein on the wall of the case body, there is a cooling fan having electrical connection with an electric supply.

8. The portable solar teaching aid according to claim 1, the portable case has an aluminum shell, and holders are equipped inside the cover for fixing teaching appliances.

* * * * *